United States Patent
Tseng et al.

(10) Patent No.: US 7,472,058 B2
(45) Date of Patent: Dec. 30, 2008

(54) AUTOMATIC AUDIO SOURCE DETECTION FOR CAPTURE DEVICES

(75) Inventors: Wei-Hsin Tseng, Taipei Hsien (TW); Wen-Hsiang Lee, Taipei (TW); Huan-Yuan Peng, Taipei Hsien (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 679 days.

(21) Appl. No.: 10/905,335

(22) Filed: Dec. 28, 2004

(65) Prior Publication Data

US 2006/0142998 A1 Jun. 29, 2006

(51) Int. Cl.
*G10L 11/00* (2006.01)
*H04N 7/00* (2006.01)

(52) U.S. Cl. ............... 704/215; 348/729; 381/2; 381/12; 379/202.1

(58) Field of Classification Search ............ 381/2, 381/12; 348/729; 379/202.1; 704/215
See application file for complete search history.

(56) References Cited

U.S. PATENT DOCUMENTS

| | | | | |
|---|---|---|---|---|
| 3,730,995 A | * | 5/1973 | Mathews | 381/110 |
| 5,305,105 A | * | 4/1994 | Heo | 348/485 |
| 5,561,737 A | * | 10/1996 | Bowen | 704/275 |
| 5,625,697 A | * | 4/1997 | Bowen et al. | 381/92 |
| 6,346,927 B1 | * | 2/2002 | Tran et al. | 345/1.1 |
| 6,473,135 B1 | * | 10/2002 | Iwamura | 348/706 |
| 7,236,600 B1 | * | 6/2007 | Bonneville | 381/77 |
| 2005/0054315 A1 | * | 3/2005 | Bajgrowicz et al. | 455/245.1 |
| 2005/0138617 A1 | * | 6/2005 | Friedman | 717/174 |
| 2005/0154766 A1 | * | 7/2005 | Huang et al. | 707/104.1 |
| 2006/0013416 A1 | * | 1/2006 | Truong et al. | 381/119 |
| 2007/0030155 A1 | * | 2/2007 | Van Woudenberg | 340/573.1 |

FOREIGN PATENT DOCUMENTS

JP 2000330537 A * 11/2000

* cited by examiner

*Primary Examiner*—Daniel D Abebe
(74) *Attorney, Agent, or Firm*—Winston Hsu

(57) ABSTRACT

A method for selecting an audio source when capturing audio data with at least one capture device includes connecting an audio source to an audio input port of the capture device, turning off the output of the audio source, calculating first signal strengths of the audio signals detected through the audio input ports of the capture device, turning on the output of the audio source, calculating second signal strengths of the audio signals detected through the audio input ports of the capture device, calculating a signal change between the first signal strength and the second signal strength of each audio input port, and selecting the audio input port with the largest signal change.

16 Claims, 5 Drawing Sheets

AUTOMATIC AUDIO SOURCE DETECTION FOR CAPTURE DEVICES

BACKGROUND OF INVENTION

1. Field of the Invention

The present invention relates to audio capture devices, and more specifically, to a method and related device for automatically selecting an audio input port when capturing audio data.

2. Description of the Prior Art

When capturing audio data, end users generally need to manually select the correct audio source among several different possible audio sources. Capture devices often have several different audio input ports that can be used for inputting audio signals from different audio sources. For example, suppose a user wants to use a capture card to capture a TV program or a program played on a VCR. Before capturing can begin, the user needs to select the correct audio input port through which the audio signals are input. The capture device may contain audio input ports such as "line-in" and "aux-in", as well as a variety of other input ports such as microphone, CD-in, and so on. The capture software will present a menu or a switch for having the user select the proper audio input port.

Please refer to FIG. 1. FIG. 1 is a flowchart illustrating manually selecting an audio input port according to the prior art. Steps contained in the flowchart will be explained below.

Step 10: Start;

Step 12: Connect an audio cable of the audio source to an audio input port of the capture device;

Step 14: Use a software menu to select an audio input port of the capture device through which to capture the audio data;

Step 16: Test to see if the selected audio input port is receiving the correct audio data;

Step 18: If the selected audio input port is correct, go to step 20; if not, go to step 14 to select another audio input port; and Step 20: End.

As shown in FIG. 1, the user must use a software menu for selecting the audio input port through trial and error. The more available audio input ports there are to select from, the greater the chances are that the user will choose incorrectly. Not only does this slow down the setup process for capturing audio, but it may also lead to incorrect audio recordings being made.

SUMMARY OF INVENTION

It is therefore an objective of the claimed invention to provide a method and related device for automatically selecting an audio input port when capturing audio data in order to solve the above-mentioned problems.

According to the claimed invention, a method for selecting an audio source when capturing audio data with at least one capture device is disclosed. The method comprises connecting an audio source to an audio input port of the capture device; turning off the output of the audio source; calculating first signal strengths of the audio signals detected through the audio input ports of the capture device; turning on the output of the audio source; calculating second signal strengths of the audio signals detected through the audio input ports of the capture device; calculating a signal change between the first signal strength and the second signal strength of each audio input port; and selecting the audio input port with the largest signal change.

According to another exemplary embodiment of the claimed invention, an audio source detection system is disclosed. The audio source detection system comprises at least one capture device with a plurality of audio input ports for receiving audio signals; a strength calculation unit for calculating signal strengths of the audio signals detected through the audio input ports of the capture device; a first memory space for storing the first signal strengths of the audio signals detected through the capture device calculated while the output of the audio source is turned off; a second memory space for storing the second signal strengths of the audio signals detected through the capture device calculated while the output of the audio source is turned on; a signal change calculation unit for calculating a signal change between the first signal strength and the second signal strength of each audio input port; and a selection unit for selecting the audio input port with the largest signal change.

According to another exemplary embodiment of the claimed invention, a method for selecting an audio source when capturing audio data with at least one capture device is disclosed. The method comprises connecting an audio source to an audio input port of the capture device; calculating signal strengths of the audio signals detected through the audio input ports of the capture device; and selecting the audio input port with the highest signal strength.

According to another exemplary embodiment of the claimed invention, an audio source detection system is disclosed. The audio source detection system comprises at least one capture device with a plurality of audio input ports for receiving audio signals; a strength calculation unit for calculating signal strengths of the audio signals detected through the audio input ports of the capture device; and a selection unit for selecting the audio input port with the highest signal strength.

According to another exemplary embodiment of the claimed invention, a method for selecting an audio source when capturing audio data with at least one capture device is disclosed. The method comprises connecting an audio source to an audio input port of the capture device; turning off the output of the audio source; calculating signal strengths greater than a threshold of the audio signals detected through the audio input ports of the capture device; recoding the detected audio input ports; turning on the output of the audio source; determining if at least one audio input port each with the signal strength greater than the threshold other than the recorded audio input ports is newly detected; and selecting the newly detected audio input port.

It is an advantage of the claimed invention that the signal strengths of the audio input ports are calculated for aiding in the automatic selection of the proper audio input port. With the claimed invention, the user does not have to worry about accidentally selecting the wrong audio input port. Moreover, the correct audio input port can be automatically selected with a high degree of accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
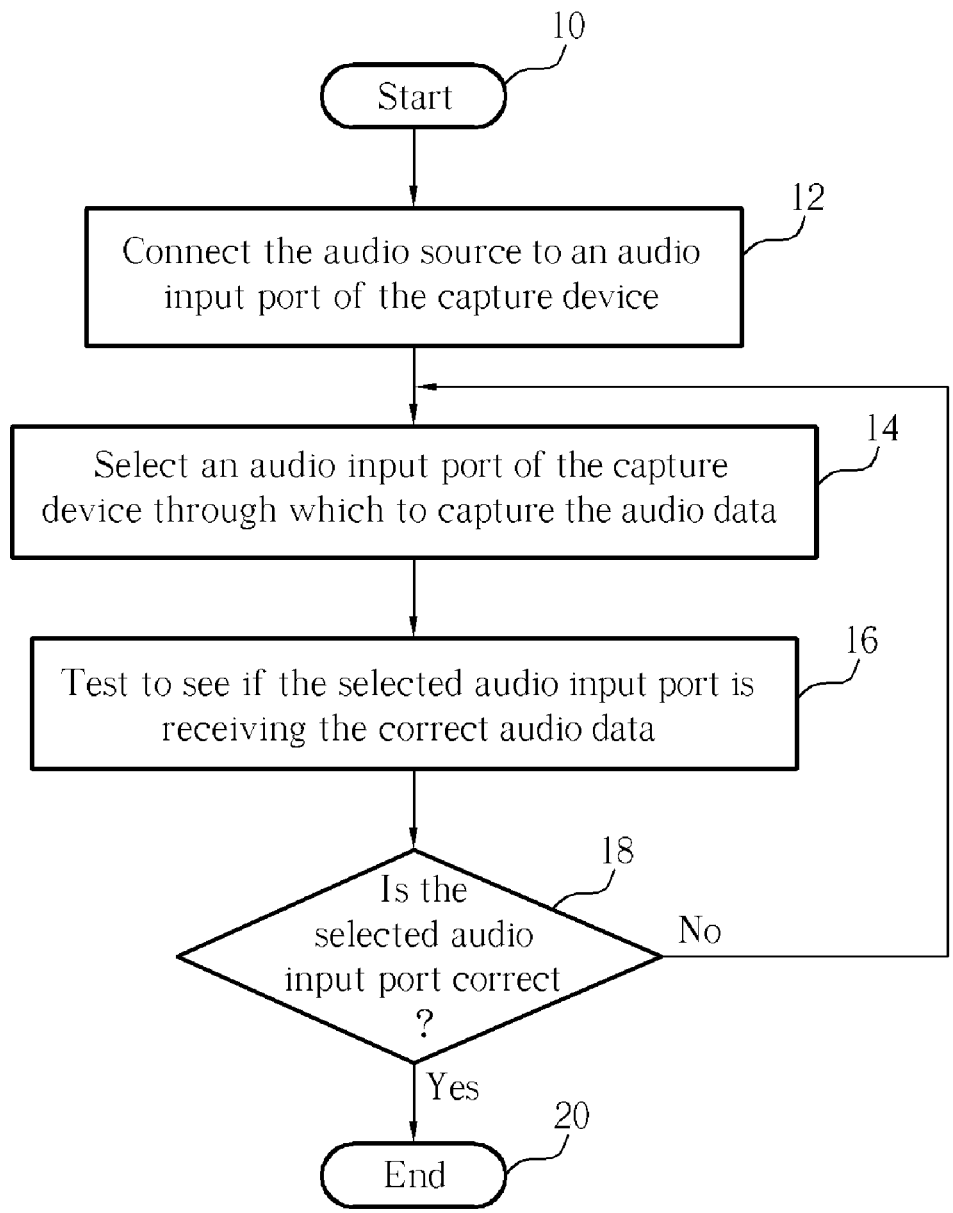
FIG. 1 is a flowchart illustrating manually selecting an audio input port according to the prior art.
Figure 2:
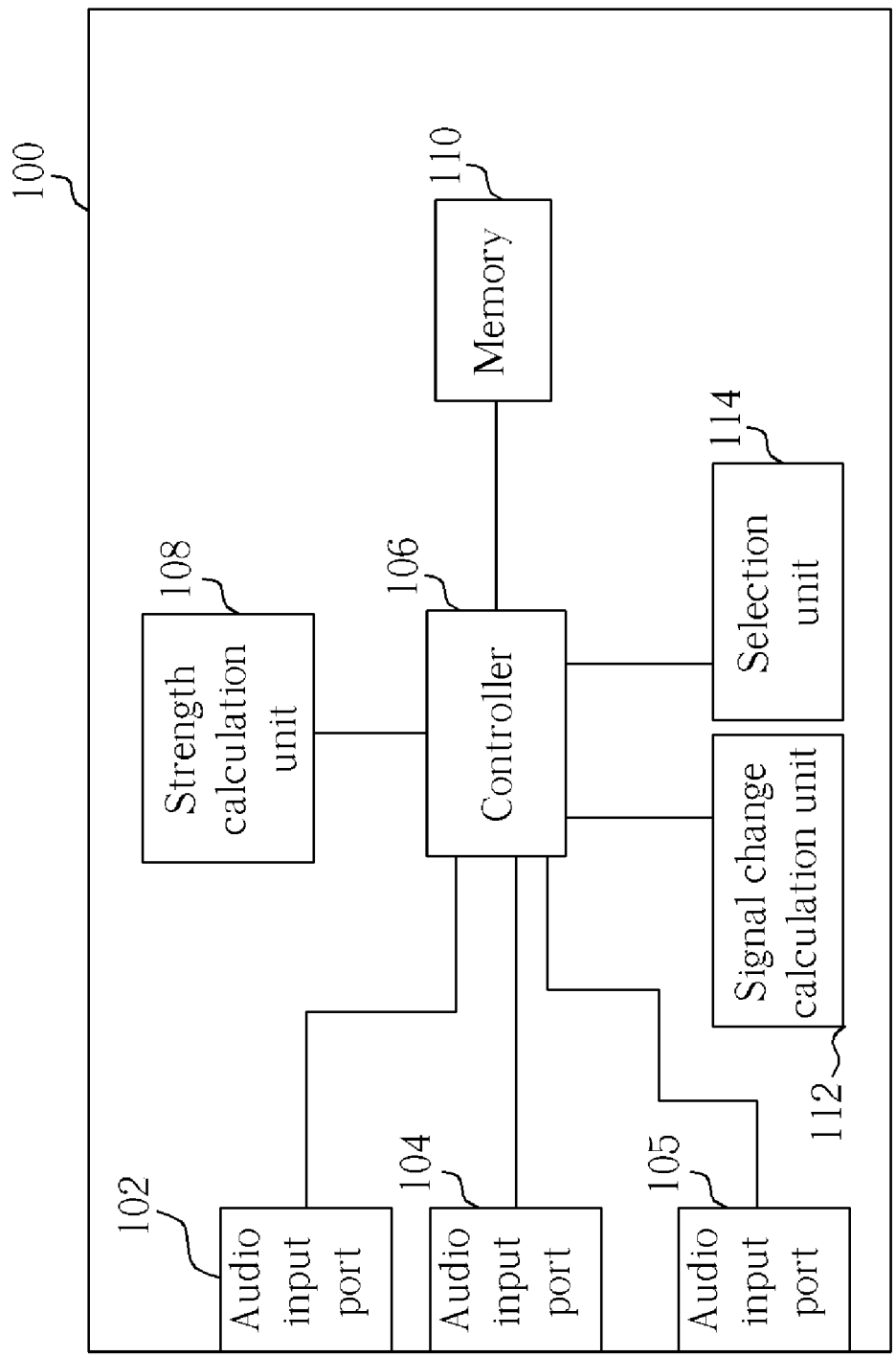
FIG. 2 is a functional block diagram of a capture device according to the present invention.

Please refer to FIG. 2. FIG. 2 is a functional block diagram of a capture device 100 according to the present invention. The capture device 100 contains a plurality of audio input ports 102, 104, 105 used for capturing audio data. For example, the capture device 100 can be an external or internal capture card or sound card. The capture device 100 can be a built-in or external capture device of a sound processing device such as a computer.

The capture device 100 of the present invention is able to automatically detect which audio input port 102, 104, 105 is being used to input audio signals, and to select that audio source for capturing audio data. The capture device 100 contains a controller 106 for controlling operation of the capture device 100. The strength of the various audio signals are calculated in a strength calculation unit 108. The audio signal strengths are then stored in a memory 110, and a selection unit 114 is used for selecting an audio input port according to predefined signal strength characteristics. As will be explained in greater detail below, the selection unit 114 selects the audio signal that the user most likely intended to capture. After the selection unit 114 makes this selection, the capture device 100 then captures audio from the corresponding audio input port 102, 104, 105. In this way, the capture device 100 is able to automatically select the correct audio input port 102, 104, 105, and relieves the user from having to select the correct port from among the plurality of ports.

Figure 3:
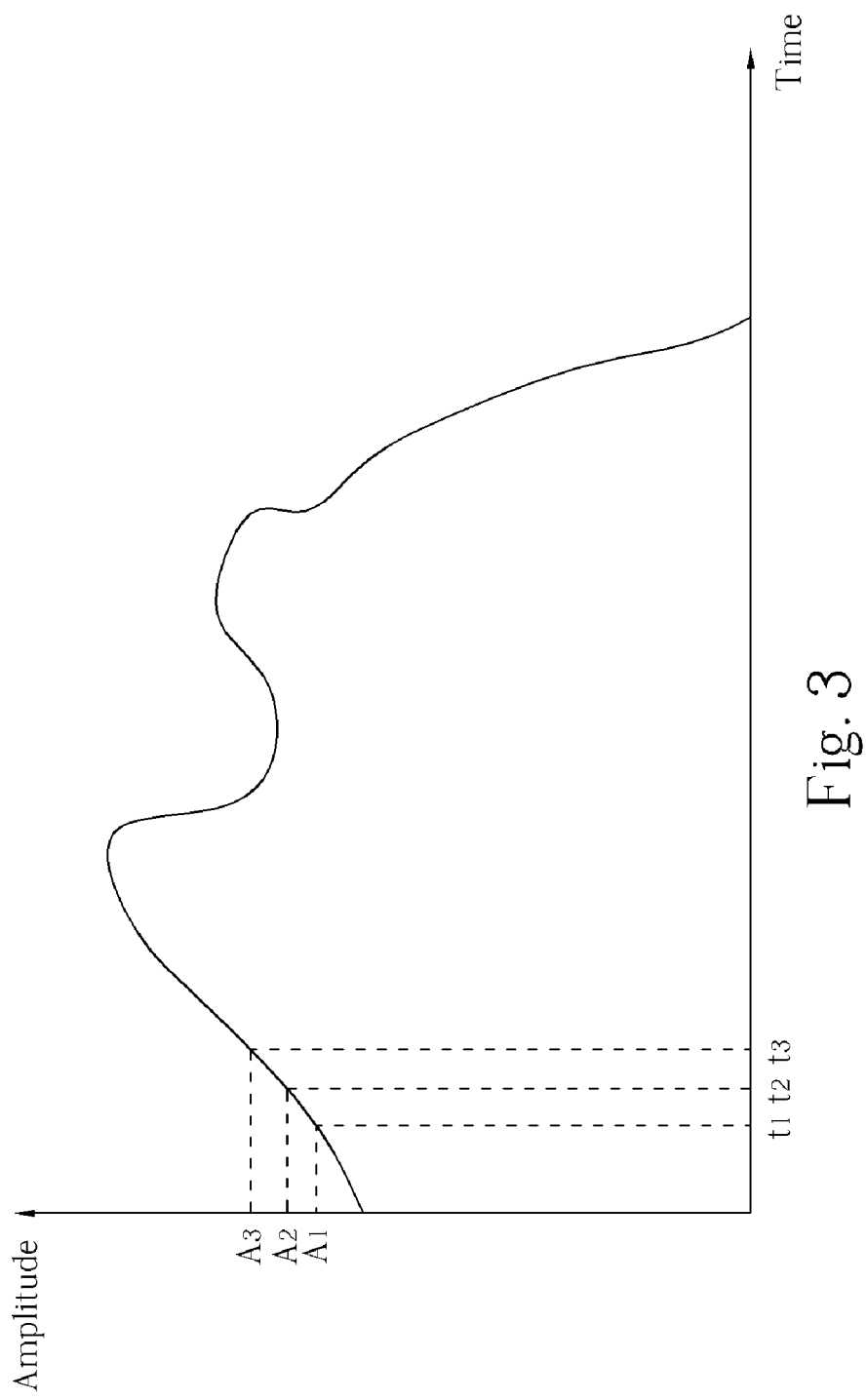
FIG. 3 is a graph plotting amplitude versus time of a detected audio signal.

Please refer to FIG. 3. FIG. 3 is a graph plotting amplitude versus time of a detected audio signal. The strength calculation unit 108 can calculate signal strength in several different ways. For instance, the signal strength SS can be calculated according to equation (1) shown below:

$$SS = \left(\frac{\Delta A_1}{\Delta t}\right)^2 + \left(\frac{\Delta A_2}{\Delta t}\right)^2 + \ldots \quad (1)$$

As shown in FIG. 3, the signal plot is divided into two time periods. The first time period starts with time $t_1$ and ends with time $t_2$, whereas the second time period starts with time $t_2$ and ends with time $t_3$. The time periods are preferably all equal, so that the difference in time between times $t_1$ and $t_2$ is the same as the difference in time between times $t_2$ and $t_3$. For each of the times $t_1$, $t_2$, $t_3$, there is a corresponding audio signal amplitude value $A_1$, $A_2$, $A_3$.

Equation (1) calculates the difference in amplitude of the audio signal for each time period divided by the amount of time in the time period, and squares the quotient. This calculation is repeated for each time period sampled by the strength calculation unit 108, with the respective results being added together. For example, using the labels shown in FIG. 3, the first term in equation (1) would be $$\left(\frac{A_2 - A_1}{t_2 - t_1}\right)^2.$$

Please note that other equations can also be used for calculating the signal strengths of the audio signals, such as equation (2) shown below:

$$SS = \left|\frac{\Delta A_1}{\Delta t}\right| + \left|\frac{\Delta A_2}{\Delta t}\right| + \ldots \quad (2)$$

Compared to equation (1), equation (2) takes the absolute value of each term instead of squaring each term so that the signal strength SS is given a positive value. Please note that other equations for calculating the signal strength may also be used with the present invention. For best results, all terms in the equation should produce a result of the same sign. That is, all results should be positive or all results should be negative.

According to a first embodiment of the present invention, after the strength calculation unit 108 calculates signal strengths for each of the audio signals input through the audio input ports 102, 104, 105, the audio signal containing the highest signal strength is selected to be the audio signal that the capture device 100 captures.

Figure 4:
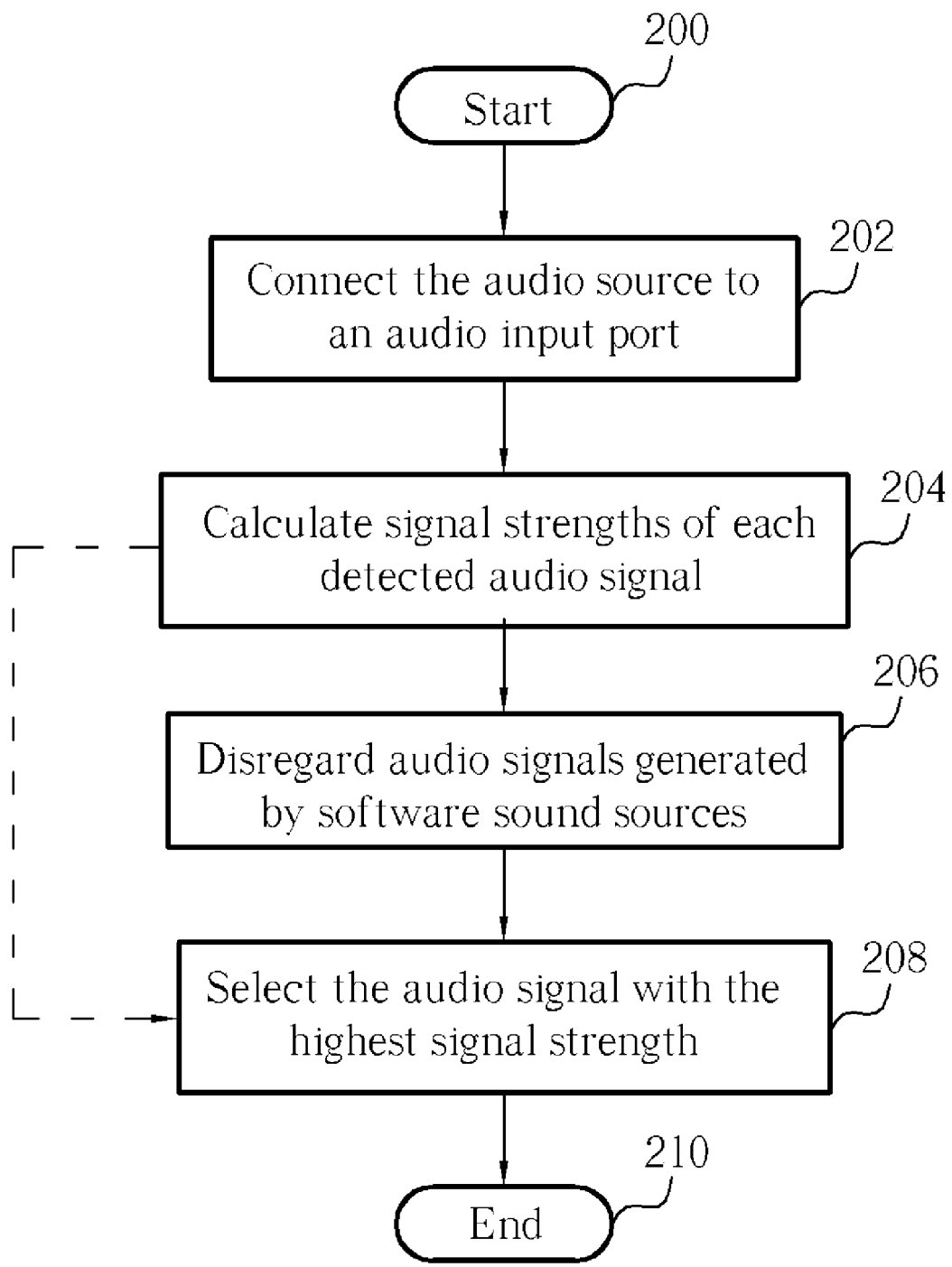
FIG. 4 is a flowchart illustrating automatically detecting an audio source when capturing audio data according to the first embodiment of the present invention.

Please refer to FIG. 4. FIG. 4 is a flowchart illustrating automatically detecting an audio source when capturing audio data according to the first embodiment of the present invention. Steps contained in the flowchart will be explained below.

Step 200: Start;

Step 202: Connect an audio cable of the audio source to be captured to one of the audio input ports 102, 104, 105 of the capture device 100;

Step 204: Use the strength calculation unit 108 to calculate signal strengths of each of the audio signals detected through the audio input ports 102, 104, 105, and store the signal strengths in the memory 110;

Step 206: Disregard audio signals generated by software sound sources, and only consider audio signals input through physical audio input ports 102, 104, 105 of the capture device 100;

Step 208: Use the selection unit 114 to select the audio signal with the highest signal strength, and select the corresponding audio input port to capture audio data from; and Step 210: End.

As denoted by the dotted line bypassing step 206, step 206 is optional. The first embodiment of the present invention selects the audio signal with the highest signal strength to be captured. This assumes the user will increase the signal strength of the audio signal to be captured relative to the other audio signals input to the capture device 100.

Figure 5:
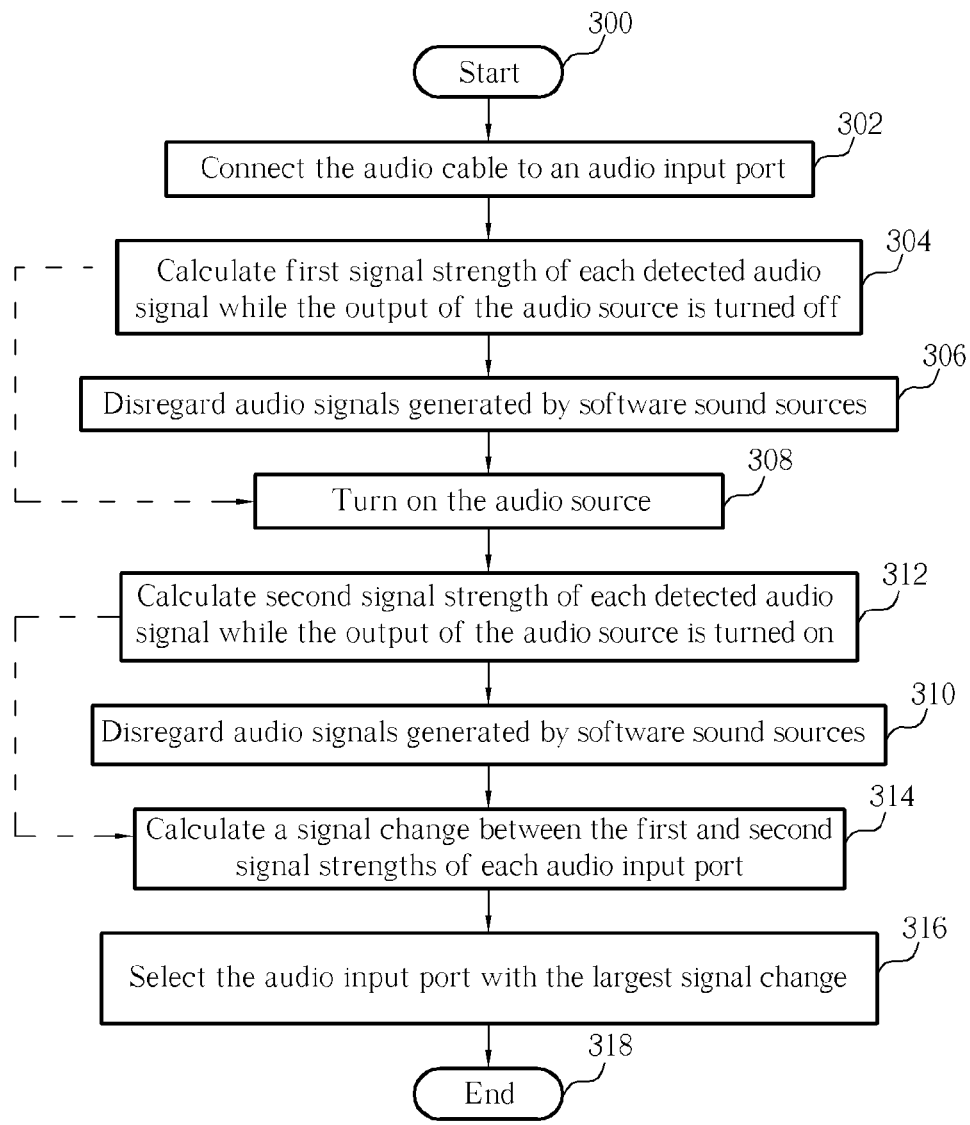
FIG. 5 is a flowchart illustrating automatically detecting an audio source when capturing audio data according to the second embodiment of the present invention.

For increasing the success rate in which the capture device 100 correctly chooses the desired audio source, a second embodiment of the present invention is disclosed. In the second embodiment of the present invention, the output of the audio source to be captured is turned on and off for allowing the capture device 100 to better detect which audio source is to be captured. Please refer to FIG. 5. FIG. 5 is a flowchart illustrating automatically detecting an audio source when capturing audio data according to the second embodiment of the present invention. Steps contained in the flowchart will be explained below.

Step 300: Start;

Step 302: Connect an audio cable of the audio source to be captured to one of the audio input ports 102, 104, 105 of the capture device 100;

Step 304: Use the strength calculation unit 108 to calculate the first signal strength of each audio signal detected through the audio input ports 102, 104, 105 while the output of the audio source to be captured is turned off. Store the first signal strengths in the memory 110;

Step 306: Disregard audio signals generated by software sound sources, and only consider audio signals input through physical audio input ports 102, 104, 105 of the capture device 100;

Step 308: Turn on the output of the audio source to be captured;

Step 310: Use the strength calculation unit 108 to calculate the second signal strength of each audio signal detected through the audio input ports 102, 104, 105 while the output of the audio source to be captured is turned on. Store the second signal strengths in the memory 110;

Step 312: Disregard audio signals generated by software sound sources, and only consider audio signals input through physical audio input ports 102, 104, 105 of the capture device 100;

Step 314: Use a signal change calculation unit 112 for calculating a signal change between the first signal strength and the second signal strength corresponding to each audio input port;

Step 316: Use the selection unit 114 to select the audio input port corresponding to the audio signal with the largest increase in signal strength between the first and second signal strengths; and Step 318: End.

As denoted by the dotted lines bypassing steps 306 and 312, these steps are optional, but preferred for increasing the selection accuracy.

In step 316, the selection unit 114 selects the audio input port corresponding to the audio signal which experienced the largest increase in signal strength from the first time signal strengths were calculated to the second time the signal strengths were calculated. Ideally, the first signal strength for the selected audio signal would be very small or have a value of zero since the output of the audio source was turned off when the first signal strength was calculated. Also, the second signal strength for the selected audio signal would ideally be large since the second signal strength was calculated after the output of the audio source was turned on. The method according to the second embodiment of the present invention has a high degree of success in selecting the correct audio signal, and is preferably utilized instead of the first embodiment method when possible.

Please note that besides the first and second embodiments of the present invention, other possible methods can be used for selecting an audio source when capturing audio data with the capture device 100. For instance, instead of calculating a change in signal strength between a first signal strength and a second signal strength, a threshold can be used for detecting and selecting the audio source to be captured. When calculating the first signal strengths, those strengths greater than a threshold are stored in the memory 110, and their corresponding audio input ports are recorded. Then, the output of the audio source to be captured is turned on and the second signal strengths are calculated. If there is now a newly detected audio input port whose corresponding second signal strength is greater than the threshold but whose first signal strength was less than the threshold, the corresponding audio source is selected as the audio source to be captured.

In summary, the present invention is able to automatically select the proper audio input port to use for capturing audio data based on signal strength calculations of the available audio signals. Thus, the user does not have to worry about being able to correctly select the correct audio input source when capturing audio data. The present invention allows the audio capturing process to be started more quickly, and with a greater degree of accuracy in selecting the correct audio source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for selecting an audio source when capturing audio data with at least one capture device, the method comprising:

connecting an audio source to an audio input port of the capture device;

calculating first signal strengths of the audio signals detected through the audio input ports of the capture device while turning off the output of the audio source;

calculating second signal strengths of the audio signals detected through the audio input ports of the capture device while turning on the output of the audio source;

disregarding the audio signals generated by software sound sources when calculating the first and second signal strengths of the audio signals detected through the audio input ports of the capture device;

calculating a signal change between the first signal strength and the second signal strength of each audio input port; and selecting the audio input port with the largest signal change.

2. The method of claim 1, wherein the audio signals detected through the audio input ports of the capture device include audio signals detected through all physical audio input ports of the capture device.

3. The method of claim 1, wherein the first and second signal strengths of the audio signals detected through the audio input ports are calculated based on the amplitudes of the audio signals measured during sampled time periods.

4. The method of claim 1, wherein selecting the audio input port with the largest signal change comprises selecting the audio input port with the largest increase in signal strength between the first and second signal strengths.

5. The method of claim 1, wherein the capture device is a built-in capture device of a sound processing device.

6. The method of claim 1, wherein the capture device is an audio capture card connected to a sound processing device.

7. An audio source detection system, comprising:

at least one capture device with a plurality of audio input ports for receiving audio signals;

a strength calculation unit for calculating first and second signal strengths of the audio signals detected through the audio input ports of the capture device, wherein when calculating the first and second signal strengths of the audio signals detected through the audio input ports of the capture device, the strength calculation unit disregards audio signals generated by software sound sources;

a first memory space for storing the first signal strengths of the audio signals detected through the capture device calculated while the output of the audio source is turned off;

a second memory space for storing the second signal strengths of the audio signals detected through the capture device calculated while the output of the audio source is turned on;

a signal change calculation unit for calculating a signal change between the first signal strength and the second signal strength of each audio input port; and a selection unit for selecting the audio input port with the largest signal change.

8. The system of claim 7, wherein the strength calculation unit calculates the first and second signal strengths of the audio signals detected through all physical audio input ports of the capture device.

9. The system of claim 7, wherein the strength calculation unit calculates the first and second signal strengths of the audio signals based on the amplitudes of the audio signals measured during sampled time periods.

10. The system of claim 7, wherein the selection unit selects the audio input port with the largest increase in signal strength between the first and second signal strengths.

11. A method for selecting an audio source when capturing audio data with at least one capture device, the method comprising:
connecting an audio source to an audio input port of the capture device;
calculating signal strengths greater than a threshold of the audio signals detected through the audio input ports of the capture device while turning off the output of the audio source;
recording the detected audio input ports;
turning on the output of the audio source;
determining if at least one audio input port each with the signal strength greater than the threshold other than the recorded audio input ports is newly detected; and
selecting the newly detected audio input port.

12. The method of claim 11, further comprising disregarding the audio signals generated by software sound sources when calculating the first and second signal strengths of the audio signals detected through the audio input ports of the capture device.

13. The method of claim 11, wherein the audio signals detected through the audio input ports of the capture device include audio signals detected through all physical audio input ports of the capture device.

14. The method of claim 11, wherein the signal strengths of the audio signals detected through the audio input ports are calculated based on the amplitudes of the audio signals measured during sampled time periods.

15. The method of claim 11, wherein the capture device is a built-in capture device of a sound processing device.

16. The method of claim 11, wherein the capture device is an audio capture card connected to a sound processing device.

* * * * *